(12) United States Patent
Vokey et al.

(10) Patent No.: US 12,442,192 B1
(45) Date of Patent: Oct. 14, 2025

(54) METHOD OF PROVIDING A CONDUCTIVE SUBSTRATE FOR AN ELECTRICAL LEAK DETECTION METHOD AND A BOARD THEREFOR

(71) Applicant: Detec Systems LLC, Bellingham, WA (US)

(72) Inventors: David Vokey, Bellingham, WA (US); Shaun Katz, Lynden, WA (US); Murphy Vockeroth, Burnaby (CA); Patricia Vokey, Bellingham, WA (US); Andrew Preiksa, Mount Vernon, WA (US)

(73) Assignee: Detec Systems LLC, Bellingham, WA (US)

( * ) Notice: Subject to any disclaimer, the term of this patent is extended or adjusted under 35 U.S.C. 154(b) by 0 days.

(21) Appl. No.: 19/210,053

(22) Filed: May 16, 2025

(51) Int. Cl.
  *E04D 13/00* (2006.01)
  *E04D 11/02* (2006.01)
  *G01M 3/16* (2006.01)

(52) U.S. Cl.
  CPC ............ *E04D 13/006* (2013.01); *E04D 11/02* (2013.01); *G01M 3/16* (2013.01)

(58) Field of Classification Search
  CPC ......... E04D 11/02; E04D 13/006; G01M 3/16
  USPC ..................................................... 52/745.06
  See application file for complete search history.

(56) References Cited

U.S. PATENT DOCUMENTS

| | | | | |
|---|---|---|---|---|
| 3,411,256 | A * | 11/1968 | Best | E04D 13/16 52/515 |
| 3,763,614 | A * | 10/1973 | Hyde | E04D 11/02 428/312.4 |
| 3,958,373 | A * | 5/1976 | Stewart | E04D 13/1643 52/273 |
| 3,967,197 | A * | 6/1976 | Anderson | E04D 13/006 324/689 |
| 4,016,323 | A * | 4/1977 | Volovsek | E04D 11/02 427/373 |
| 4,063,395 | A * | 12/1977 | Stewart | E04D 3/351 220/900 |
| 4,110,945 | A * | 9/1978 | Sheahan | G01M 3/16 324/696 |
| 4,351,138 | A * | 9/1982 | McMillan | E04D 11/02 52/309.4 |

(Continued)

FOREIGN PATENT DOCUMENTS

PL           204045 B1 * 12/2009 ............. B32B 19/06

*Primary Examiner* — James M Ference
(74) *Attorney, Agent, or Firm* — Adrian D. Battison; Ade & Company Inc.; Ryan W. Dupuis

(57) ABSTRACT

A method of constructing a waterproof layer on a roof deck includes applying an array of coverboards covering the roof deck and a water impermeable membrane. In a leak detection method, an electrical potential is applied between a conductive detector on top of the membrane and a conductor below the membrane such that current flows between the conductor and the conductive detector through moisture or liquid in any leak in the membrane. Each coverboard comprises a base layer of an electrically non-conductive support and insulating material with an upper surface which has laminated thereto a facer sheet material which is formed of an electrically non-conductive material which can be fibers in a binder with an electrically conducting material mixed into the binder.

7 Claims, 3 Drawing Sheets

(56) References Cited

U.S. PATENT DOCUMENTS

| | | | | |
|---|---|---|---|---|
| 4,397,126 A * | 8/1983 | Nelson | E04D 13/0477 | 52/302.3 |
| 4,404,516 A * | 9/1983 | Johnson, Jr. | G01M 3/045 | 324/718 |
| 4,502,044 A * | 2/1985 | Farris | G01M 3/045 | 340/604 |
| 4,565,965 A * | 1/1986 | Geesen | E04D 15/00 | 324/705 |
| 4,598,273 A * | 7/1986 | Bryan, Jr. | E04D 13/006 | 73/304 R |
| 4,651,494 A * | 3/1987 | Van Wagoner | E04D 11/02 | 52/302.1 |
| 4,719,723 A * | 1/1988 | Van Wagoner | E04D 13/1693 | 52/309.4 |
| 4,965,554 A * | 10/1990 | Darling | E04D 13/006 | 73/40 |
| 4,996,803 A * | 3/1991 | Karrfalt | E04D 13/1643 | 52/63 |
| 5,193,326 A * | 3/1993 | Sheahan | G01M 3/04 | 52/698 |
| 5,193,390 A * | 3/1993 | Nill, Jr. | G01M 3/16 | 73/335.02 |
| 5,212,927 A * | 5/1993 | Sheahan | E04D 13/006 | 52/410 |
| 5,288,168 A * | 2/1994 | Spencer | E02D 31/00 | 324/559 |
| 5,317,852 A * | 6/1994 | Howland | E04D 11/02 | 52/302.1 |
| 5,540,085 A * | 7/1996 | Sakata | G01M 3/16 | 73/40 |
| 5,818,340 A * | 10/1998 | Yankielun | E04D 13/006 | 324/696 |
| 5,850,144 A * | 12/1998 | Howells | E02D 31/004 | 324/559 |
| 6,167,666 B1 * | 1/2001 | Kelly | E04D 13/006 | 52/302.1 |
| 7,234,284 B2 * | 6/2007 | Paradise | C08L 95/00 | 156/72 |
| 8,500,931 B2 * | 8/2013 | Subotsch | E04D 7/00 | 156/306.9 |
| 9,624,671 B1 * | 4/2017 | Gunness | E04D 13/006 | |
| 9,624,672 B1 * | 4/2017 | Gunness | G01N 27/20 | |
| 9,771,703 B1 * | 9/2017 | Golding, Jr. | B32B 5/022 | |
| 10,214,907 B1 * | 2/2019 | Gunness | E04D 13/006 | |
| 10,519,664 B1 * | 12/2019 | Gunness | G01M 3/16 | |
| 10,571,141 B1 * | 2/2020 | Gray | E04D 13/006 | |
| 12,338,629 B2 * | 6/2025 | Kann | G01M 3/16 | |
| 2003/0209305 A1 * | 11/2003 | Smith | E04D 12/002 | 428/411.1 |
| 2004/0003563 A1 * | 1/2004 | Burdic | E04D 13/16 | 52/410 |
| 2006/0105662 A1 * | 5/2006 | Jaffee | D21H 13/26 | 442/163 |
| 2006/0228963 A1 * | 10/2006 | Souther | B32B 7/12 | 442/364 |
| 2007/0046481 A1 * | 3/2007 | Vokey | G01M 3/165 | 340/602 |
| 2007/0086693 A1 * | 4/2007 | Murphy | G02B 6/29385 | 385/12 |
| 2008/0143349 A1 * | 6/2008 | Lorenz | G01M 3/16 | 324/691 |
| 2008/0209825 A1 * | 9/2008 | Smith | E04D 13/006 | 52/169.14 |
| 2009/0044595 A1 * | 2/2009 | Vokey | E04D 13/006 | 73/1.17 |
| 2009/0188202 A1 * | 7/2009 | Vokey | E04D 5/00 | 52/741.1 |
| 2009/0199506 A1 * | 8/2009 | Vokey | E04D 13/006 | 52/741.3 |
| 2010/0141283 A1 * | 6/2010 | Vokey | G01M 3/16 | 324/705 |
| 2010/0225341 A1 * | 9/2010 | Burrows | E04D 13/006 | 324/718 |
| 2011/0178747 A1 * | 7/2011 | Gunness | G01M 3/16 | 702/65 |
| 2011/0187393 A1 * | 8/2011 | Vokey | G01M 3/16 | 324/694 |
| 2012/0197565 A1 * | 8/2012 | Gunness | G01M 3/165 | 702/64 |
| 2012/0313652 A1 * | 12/2012 | Jaman | E04D 13/006 | 324/694 |
| 2014/0049247 A1 * | 2/2014 | Gunness | E04D 13/006 | 324/71.1 |
| 2014/0114590 A1 * | 4/2014 | Gunness | G01M 3/40 | 702/51 |
| 2014/0361796 A1 * | 12/2014 | Vokey | E04D 13/006 | 324/693 |
| 2017/0130459 A1 * | 5/2017 | Vokey | G01N 27/048 | |
| 2018/0002916 A1 * | 1/2018 | Harrison | E04B 7/20 | |
| 2018/0010329 A1 * | 1/2018 | Golding, Jr. | B32B 5/26 | |
| 2018/0202163 A1 * | 7/2018 | Vokey | G01D 5/165 | |
| 2019/0022972 A1 * | 1/2019 | Draudins | B32B 7/00 | |
| 2019/0271157 A1 * | 9/2019 | Baggs | B32B 3/02 | |
| 2019/0345668 A1 * | 11/2019 | Draudins | D06M 23/04 | |
| 2021/0171808 A1 * | 6/2021 | Ackermann | B32B 27/20 | |
| 2021/0270691 A1 * | 9/2021 | Shah | E04D 5/10 | |
| 2021/0302263 A1 * | 9/2021 | Trummer | G01M 3/02 | |
| 2022/0090978 A1 * | 3/2022 | Goldstein | E04B 1/665 | |
| 2022/0275646 A1 * | 9/2022 | Jiang | B32B 7/12 | |
| 2023/0066225 A1 * | 3/2023 | Vokey | H04L 12/403 | |
| 2023/0069325 A1 * | 3/2023 | Vokey | G01N 27/048 | |
| 2023/0314264 A1 * | 10/2023 | Jackson | G01M 3/16 | 340/605 |
| 2023/0314265 A1 * | 10/2023 | Hermes | E04D 13/006 | 73/40 |
| 2024/0075711 A1 * | 3/2024 | LaBrosse | B29C 65/48 | |
| 2024/0392570 A1 * | 11/2024 | Nagarajan | E04D 11/02 | |
| 2024/0426106 A1 * | 12/2024 | Kann | G01M 3/165 | |
| 2025/0093225 A1 * | 3/2025 | Vokey | G01M 3/16 | |

* cited by examiner

METHOD OF PROVIDING A CONDUCTIVE SUBSTRATE FOR AN ELECTRICAL LEAK DETECTION METHOD AND A BOARD THEREFOR

This invention relates to a method of constructing a waterproof layer on a roof deck comprising applying onto an upper surface of the roof deck an array of boards so that the array covers at least a part of the surface of the roof deck and applying over the array of boards a water impermeable membrane wherein, in a leak detection method, an electrical potential is applied between a conductive detector on top of the membrane and a conductor below the membrane such that current flows between the conductor and the conductive detector through moisture or liquid in any leak in the membrane. The invention also relates to a board for application to a roof structure which can be used in the above method.

BACKGROUND OF THE INVENTION

Suitable methods for Electronic Leak Detection for roofing and waterproofing membranes are detailed in the international ASTM standards D7877. The ASTM standards describe test methods and equipment that create an electrical potential between a conductive detector on top of the membrane and the roof deck causing current to flow between the roof deck and the conductive detector through any breach in the membrane. The disclosure of this standard is hereby incorporated herein by reference.

In some cases, however the membranes in conventional assemblies are adhered or mechanically fastened to non-conductive materials such as a plywood substrate or protection boards which prevent use of the highly effective electric conductance testing method.

One solution to this requirement to provide a conductive layer underneath the membrane is detailed in U.S. Pat. No. 9,244,030 issued Jan. 26, 2016 by Vokey et al. This patent describes a conductive primer which typically applied by a roller or other application method to the surface of the coverboard, insulation or roof deck during construction to form a conductive substrate over which a waterproof membrane is placed. This method, while effective, adds one more step during construction of the roof. It is one object of the present invention to provide a method of forming a roof structure which overcomes this limitation while ensuring a more controlled application of a conductive layer. The disclosure of this patent is hereby incorporated herein by reference.

SUMMARY OF THE INVENTION

According to the invention therefore there is provided a method of constructing a waterproof layer on a roof deck comprising:
applying onto an upper surface of the roof deck an array of boards so that the array covers at least a part of the surface of the roof deck;
and applying onto an upper surface of the array of boards a water impermeable membrane;
wherein each board when applied comprises a base layer of an electrically non-conductive support material with an upper surface and a lower surface which has laminated or bonded to at least said upper surface thereof a facer sheet material which is formed of an electrically non-conductive material with an electrically conducting material included therewith;
whereby an electrical potential can be applied through the facer sheet material over said at least a part of the surface of the roof deck for use in leak detection method.

In accordance with another aspect there is provided a method of constructing a waterproof layer on a roof deck comprising:
applying onto an upper surface of the roof deck an array of boards so that the array covers at least a part of the surface of the roof deck;
and applying over the array of boards a water impermeable membrane;
wherein each board when applied comprises a base layer of an electrically non-conductive support material with an upper surface and a lower surface which has laminated or bonded to at least one of said upper surface thereof a facer sheet material formed of an electrically non-conductive plastic layer with an electrically conductive layer applied thereto.

In accordance with another aspect there is provided a method of constructing a waterproof layer on a roof deck comprising:
applying onto an upper surface of the roof deck an array of boards so that the array covers at least a part of the surface of the roof deck;
and applying over the array of boards a water impermeable membrane;
wherein each board when applied comprises a base layer of an electrically non-conductive support material with an upper surface and a lower surface which has laminated or bonded to at least said upper surface thereof a facer sheet material formed of an electrically non-conductive fibrous material with an electrically conducting material is embedded therein.

In accordance with another aspect there is provided a board for attachment to a roof deck underneath an impermeable membrane comprising:
a base layer of an electrically non-conductive support material with an upper surface and a lower surface which has laminated or bonded to at least said upper surface thereof a facer sheet material formed of an electrically non-conductive plastic layer with an electrically conductive layer applied thereto.

In accordance with another aspect there is provided a board for attachment to a roof deck underneath an impermeable membrane comprising:
a base layer of an insulation material with an upper surface and a lower surface which has laminated or bonded to at least said upper surface thereof a facer sheet material containing an electrically non-conductive fibrous material with an electrically conducting material embedded therein.

In accordance with another aspect there is provided a for attachment to a roof deck underneath an impermeable membrane comprising:
a base layer of a foam insulation material with an upper surface and a lower surface which has laminated or bonded to at least said upper surface thereof a facer sheet material containing an electrically non-conductive fibrous material and a binder with an electrically conducting material admixed with the binder.

As a further explanation of the preferred arrangement, a coverboard is typically used for roofing. It is considered to be a particular component in the roofing industry which may or may not be used. As one example, a roof coverboard (typically 4×8 feet) is a thin substrate (most common thickness is 0.5 inch) installed between the insulation and the roofing membrane in a flat roof system. It acts as a protective barrier, providing a smooth, flat surface for the membrane and shielding the insulation from various factors. Coverboards also enhance the overall durability and performance of the roof, offering benefits like improved fire ratings, thermal performance, and protection against hail and wind damage. If used, it is almost always placed on top of any insulation. Insulation is a separate component, and hence not referred to herein as a coverboard, that is typically 2 inches in thickness in a 4×8 foot sheet. The insulation sheets can be stacked on each other if required to achieve the R Value needed. Both the coverboard and insulating sheets almost always have a facer material applied to both surfaces. So if a coverboard is not used the facer layer of the insulation becomes the substrate over which the membrane is placed. If a coverboard is used, the top surface (facer) of the coverboard becomes the substrate. Whichever assembly is selected there is provided a conductive facer immediately under the membrane.

The conductive layer thus formed by the conductive facing sheet requires to be locate at the membrane so that the facing sheet is directly in contact with the membrane when mechanical fasteners are used and the facing sheet is separated from the membrane only by the adhesive when an adhesive fastening method is used.

Typically the support material is an insulating board material but other supporting or structural materials may be used.

For example the support material can be a board formed from one of:
  polyisocyanurate,
  gypsum,
  cement;
  perlite.

For example, the facer sheet material can be one of:
  kraft paper;
  plastic sheeting;
  coated glass facer (CGF) which is a fibrous glass mat bonded with organic polymer binders and coated with organic polymer, clay, or other inorganic substances;
  glass reinforced facer (GRF) which is composed of a blend of cellulosic fibers and glass fibers;
  perlite board;
  cellulosic fiber board;
  plywood.

In one particular arrangement, the facer sheet material is plastic sheet such as white vinyl material and the electrically conducting material is applied as a conductive foil layer thereon.

In another arrangement, the facer sheet material is a fibrous material and the electrically conducting material is embedded therein.

In another arrangement the facer sheet material comprises fibrous material contained within a binder material and wherein the electrically conducting material is admixed in the binder material.

In this arrangement, preferably the electrically conducting material is one of carbon, carbon black, conductive fibers such as carbon or steel fiber, carbon nanotubes (CNTs), graphite.

Preferably the method includes electrically connecting the facer sheet material of each coverboard to each other of the coverboards of the array. That is typically an electrical conductor is applied over the facer sheet material of at least one of the coverboards to electrically connect the coverboard to at least one other of the coverboards. It is necessary to provide continuity of connection between each board and the next so that this can be achieved by using a conducive strip which connects between each board of the array or connection between each board and the next can be provided by use of a conductive primer or filler material applied at the joints. Suitable testing to confirm continuity is desirable.

Preferably each coverboard has the electrically conductive cover sheet material laminated or bonded only to the upper surface thereof.

That is preferably each coverboard has a facer sheet material laminated or bonded to both of said upper and lower surfaces thereof but only the facer sheet material on the upper surface includes said electrically conductive material.

This method and the coverboards defined are particularly used in a leak detection method, in which the electrical potential is applied between a conductive detector on top of the membrane and the facer sheet below the membrane such that current flows between the facer sheet and the conductive detector through moisture or liquid in any leak in the membrane.

The present invention provides a method whereby the substrate has sufficient conductivity to allow the above testing method without the step of applying a conductive coating or primer on the substrate during construction over which the roof membrane is then placed.

The top layer of a conventional roof assembly often has a coverboard over which the waterproof membrane is applied. Coverboards provide a protective layer and are made of materials such as polyisocyanurate, gypsum, cement or perlite. Coverboards typically have a surface or facer material which provides a degree of flexibility, ruggedness and moisture resistance.

Polyisocyanurate, is a rigid foam insulation used in more than 70% of commercial roof construction and offers a continuous insulation solution. In construction, facer materials, like paper facer materials, are often used as a surface cover for polyisocyanurate insulation and serve as a substrate over which the waterproof membrane is placed.

In more demanding applications, coverboards are often installed on top of an insulation layer and typically incorporate a glass reinforced facer (GRF) or coated glass facer (CGF) to add more strength, dimensional stability, and improve performance in roofing applications.

The present method involves integrating or embedding a conductive material into the facer material during the facer material manufacturing stage. Such conductive materials as defined herein can be added to a binder of the facer layer during construction following which the facer material is bonded to or laminated with the binder.

The facer material is then bonded to the surface of the cover board or insulation during manufacturing. The facer which is now electrically conductive serves as the substrate over which the waterproof membrane is placed material and provides a ground return path for electronic leak detection such as those spelled out in the above cited ASTM Standard D7877.

Insulation facer materials typically are the layers on top and bottom of insulation boards, providing stability, a vapor barrier, and a surface for attachment. Common facer materials include kraft paper, white vinyl sheeting, coated glass facer, and glass reinforced facer. These facers also help to create a more effective thermal barrier and can act as a radiant barrier.

Common facer materials include:
  Glass Reinforced Facer (GRF) where GRF is a cellulosic fiber felt with glass fibers for reinforcement.
  Coated Glass Facer (CGF) where CGF is a fibrous glass mat bonded with organic polymer binders and coated with organic polymer, clay, or other inorganic substances. CGF is composed of coated, polymer bonded fibrous glass mats bonded with organic polymer binders and coated with organic polymer, clay, or other inorganic substances. The coating may be applied either to the glass fibers before bonding into mats or after the glass mats are bonded together Kraft Paper where Kraft paper is a common facer material.

White Vinyl Sheeting where White vinyl sheeting is another common facer material that can be used as a vapor barrier and air barrier.

Other Materials which can be used include Perlite board, cellulosic fiber board, and plywood.

DETAILED DESCRIPTION

Figure 1:
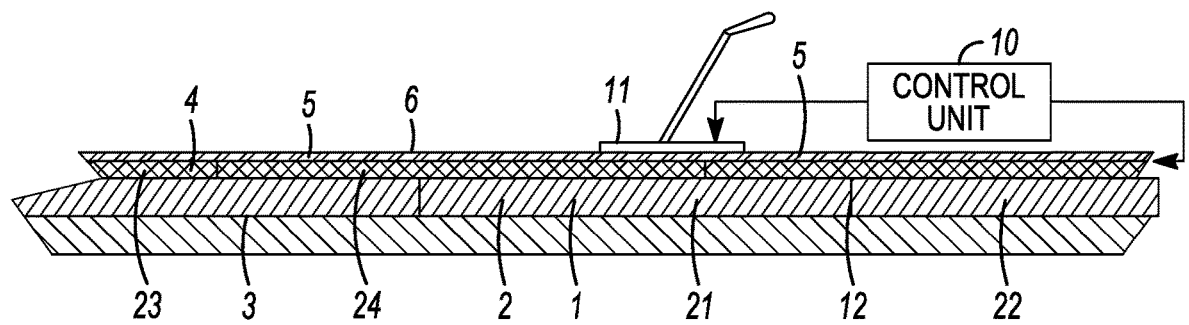
FIG. 1 is a cross-sectional view of a roof assembly including the components and method according to the present invention when used in the method for detecting leaks by the electrical potential system described above.
Figure 2:
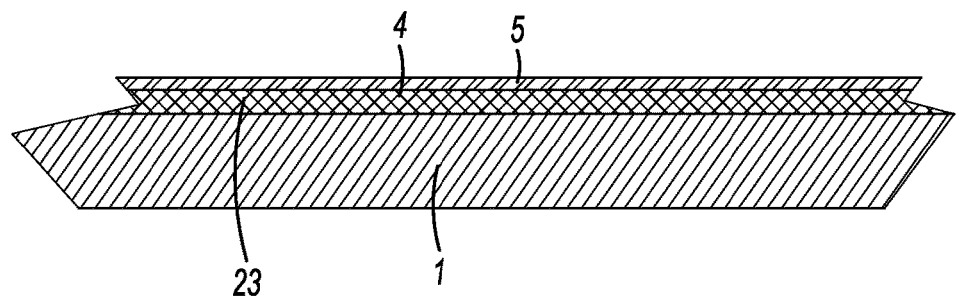
FIGS. 2 to 5 show the steps in the method of assembly of the roof structure of FIG. 1.
Figure 3:
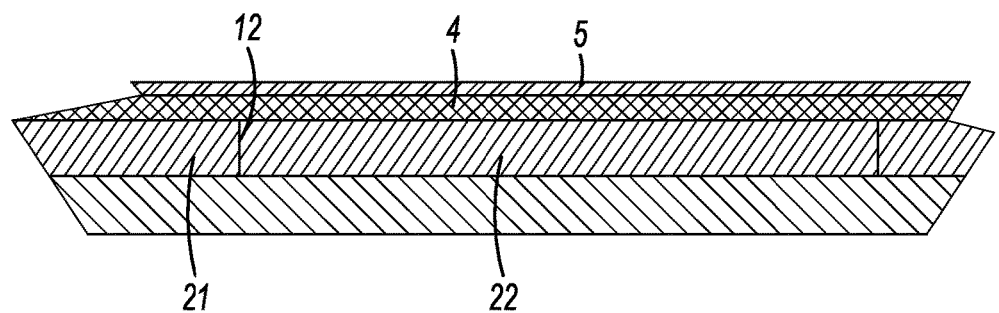
Figure 4:
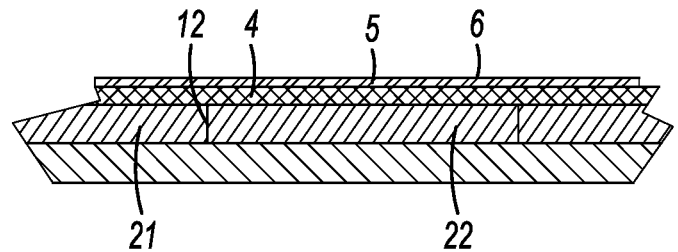

Referring to FIG. 1, a cross-sectional view of a common roof assembly is illustrated. A structural deck 1 is at the bottom of the assembly and can be a wood, concrete or metal deck and carries the weight of the roof components and loading. This is typically electrically non-conductive.

An insulation layer 2 is placed over the deck material 1. The insulation layer is formed of an array of side by side insulation sheets 21, 22 etc which are laid on the roof deck edge to edge so that the array covers at least a part of the surface of the roof deck.

Figure 5:
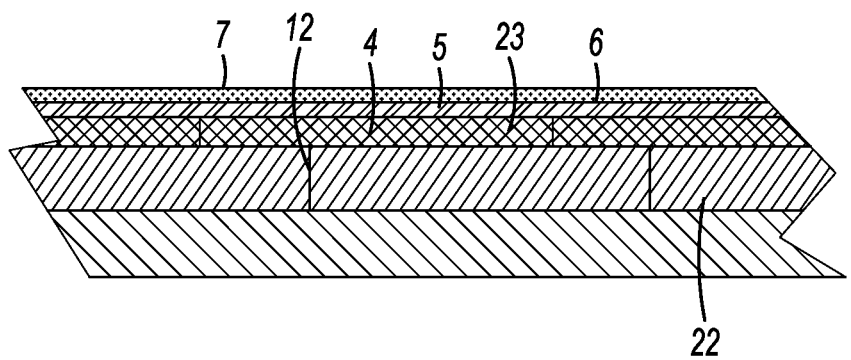

The roof structure is completed as shown in the method steps of FIG. 2 to 5 by the provision of the membrane 6 which is attached over the coverboards 23,24. The membrane can be attached to the coverboards either by an adhesive 7 as shown in FIG. 5 using conventional adhesives and methods. Alternatively, the membrane can be attached by mechanical fasteners (not shown) again using conventional material and methods.

In the leak detection method as described above and as shown in the above referenced patent, an electrical potential is applied by a control unit 10 between a conductive detector 11 on top of the membrane and the facer sheet 5 below the membrane such that current flows between the facer sheet and the conductive detector through moisture or liquid in any leak in the membrane.

In order to connect the potential to all of the side-by-side coverboards, a conductive primer is painted between an on in the joints 12 on the coverboards and in contact with the upper facer sheet 5 of each coverboard so as to extend along the length and width of the area of roof deck 1 which is covered by the cover boards.

Each coverboard 24 as supplied for installation into the assembly comprises a base layer 3 of an electrically non-conductive support material with an upper surface and a lower surface which has laminated or bonded to at least one of said upper and lower surfaces thereof a facer sheet material 4 and 5. In the figure the board 3 is covered on both faces by the facing sheet material 4 and 5. In order to make the facer sheet material electrically conductive, conductive material such as a carbon black is added during the manufacturing of the facer sheet material of at least one of the layers 4 and 5. If only one layer is conductive, this is typically the upper layer 5 so that the layer 5 is in intimate connection to the membrane.

Carbon black is available in grades that are broadly classified by their surface area and structure, which directly impacts their electrical conductivity. Higher surface area and more complex structures generally lead to greater conductivity. The grade chosen for a particular facer depends on the material used for that application and the carbon loading required. A measure level of carbon black is added to the facer binding material such that its surface resistance measures preferably in the range of 1×102 to 1×107 ohms per square. This level of resistance provides a conductivity which is very high in comparison with other materials.

For the testing method herein the current flow can be detected at very low levels. This can be obtained by providing a loading of the conductive filler into the face-binding material to produce a carbon content that is in the range from five to twenty percent (5% to 25%). The required loading of the carbon black component can be achieved without interfering with the other properties of the carrier material and at relatively low cost.

A facer material is laminated to the insulation layer, usually on both sides, during manufacture has been infused with a level of carbon black to exhibit the required conductivity for ELD testing.

An example of a roof assembly where a coverboard is used is illustrated in FIG. 5. The structural deck 1 is at the bottom of the assembly and can be a wood, concrete or metal deck and carries the weight of the roof components and loading. An insulation layer (not shown) is optionally placed over the deck material. A coverboard 21 is placed over the insulation layer. A facer material 4, 5 which is laminated to the coverboard layer 3, usually on both sides, during manufacture has been infused with a level of carbon black to exhibit the required conductivity for ELD testing. The waterproof layer or membrane 6 is then layer on top of the assembly to complete the roof.

In the above examples of roof assemblies, it is common for the insulation and coverboard layers to have facer material on both sides. However, it is possible that only the facer side that is located directly under the waterproof membrane required the carbon black component for the testing purposes is shown. That is the board can be covered on both sides 4 and 5 but only the layer 5 is conductive.

In the testing method shown in FIG. 1, testing on a roof membrane 6 is illustrated. The operator is using an ELD scanner 11 as described in the ASTM D7877 Standard. A ground wire lead 12 is connected to the conductive coverboard facer 5 which completes the electrical path to the scanner 11 through any breach in the membrane 6.

In the method an electrical potential is applied from the conductor on top of the membrane such a current will flow from surface conductor 11 through water sprayed on the membrane surface through any moisture leak in the membrane, to the conductive layer 5 and the returned to the generator through grounding conductor.

The current between the roof substrate and the conductive detector is sensed by the conductor probes applied on top of the membrane and by a sensing circuit in the control unit 10 attached to the conductor.

Figure 6:
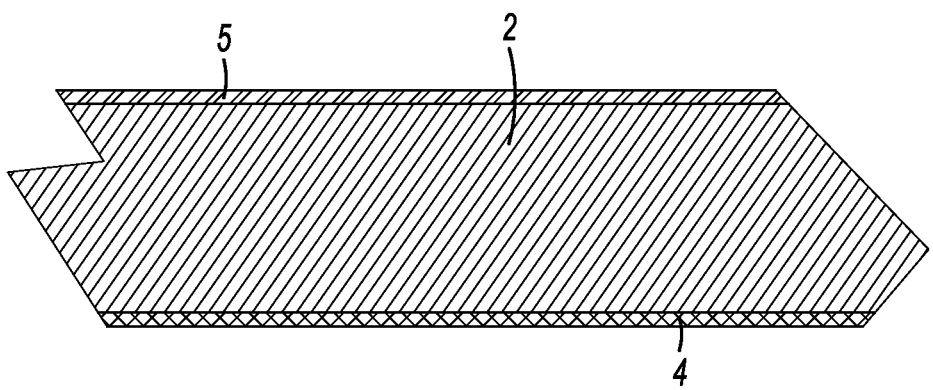
FIGS. 6, 7 and 8 are cross-sectional views of different embodiments of the coverboard shown as part of the assembly of FIG. 1.

In FIG. 6 is shown the primary embodiment in which a center board 2 of an insulating material such as polyisocyanurate is coated on both sides by facing sheets 4 and 5. Both may be rendered conductive by the addition of the conducting material or only the layer 5 may be conductive.

Figure 8:
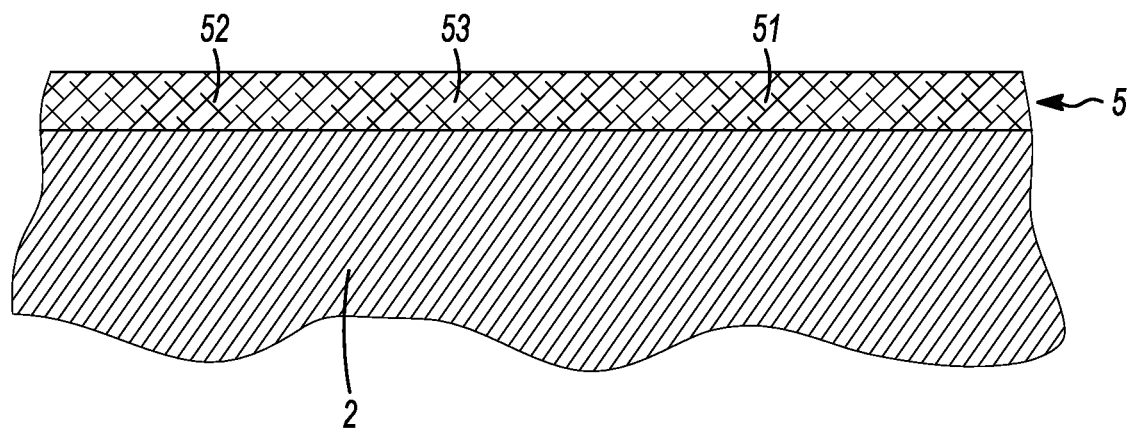

As shown in FIG. 8, the present method involves integrating or embedding a conductive material 51 into the facer material 5 during the facer material manufacturing stage. Such conductive materials as defined herein can be added to a binder 52 of the facer layer during construction. That is the fibrous material forming the facer sheet contains fibers 53 formed in conventional manner and the binder 52 which contains and engages the fibers 53 is modified by the addition of the conductive material 52 in the forms described above. After manufacture with the conductive material, the facer material 5 is bonded to or laminated with the board 2. Typically this can be done using a separate adhesive between the layers but other lamination methods may be used.

Figure 7:
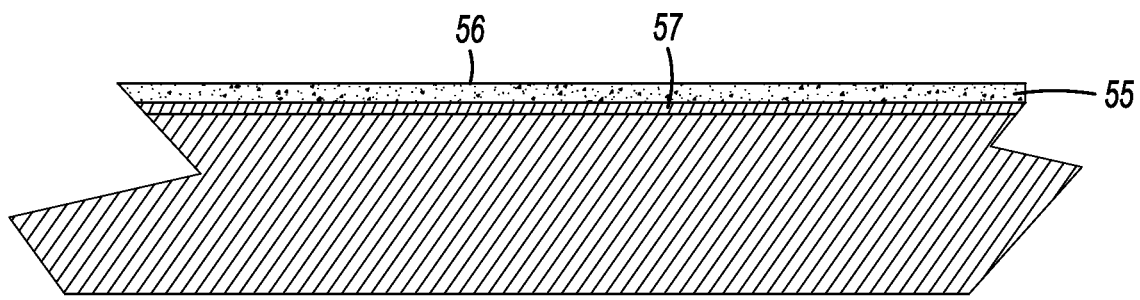

In FIG. 7 is shown an alternative arrangement in which the facer sheet 55 is formed by a sheet of a plastic material 57 onto which is bonded a foil conductive layer 56.

Since various modifications can be made in my invention as herein above described, and many apparently widely different embodiments of same made within the scope of the claims without department from such scope, it is intended that all matter contained in the accompanying specification shall be interpreted as illustrative only and not in a limiting sense.

The invention claimed is:

1. A method of constructing a waterproof layer on a roof deck comprising:
applying onto an upper surface of the roof deck an array of cover boards so that the array of cover boards covers at least a part of the upper surface of the roof deck;
and applying onto an upper surface of the array of cover boards a water impermeable membrane;
wherein each cover board of the array of cover boards when applied comprises a base layer of an electrically non-conductive support material with an upper surface and a lower surface;
boards has A wherein each cover board of the array of cover boards has, when applied onto the upper surface of the roof deck, laminated or bonded to said upper surface and said lower surface thereof a facer sheet material;
wherein the facer sheet material of at least the upper surface of each cover board of the array of cover boards comprises an electrically non-conductive material formed of electrically non-conductive fibers and a binder material;
wherein the binder material has an electrically conducting material admixed in the binder material;
wherein the facer sheet material of said array of cover boards covering said at least a part of the upper surface of the roof deck forms a first conductor underneath the membrane extending fully across said at least a part of the upper surface of the roof deck;
whereby an electrical potential can be applied through the facer sheet material over said at least a part of the upper surface of the roof deck for use in a leak detection method for detecting a leak in the membrane by detecting changes in conductivity across the membrane between the first conductor defined by the facer sheet material underneath the membrane and a second conductor above the membrane;
and wherein the first conductor underneath the membrane which extends fully across said at least a part of the upper surface of the roof deck consists solely of said electrically conducting material admixed in the binder material.

2. The method according to claim 1 wherein the base layer of the electrically non-conductive support material is an insulating sheet material.

3. The method according to claim 1 wherein the base layer of the electrically non-conductive support material is a sheet material formed from one of:
polyisocyanurate,
gypsum,
cement;
perlite.

4. The method according to claim 1 wherein the facer sheet material is one of:
kraft paper:
coated glass facer (CGF) which is a fibrous glass mat in the binder;
glass reinforced facer (GRF) which is composed of a blend of cellulosic fibers and glass fibers in the binder.

5. The method according to claim 1 wherein the electrically conducting material admixed in the binder is one of carbon, carbon black, conductive carbon fibers, conductive steel fibers, carbon nanotubes (CNTs), and graphite.

6. The method according to claim 1 including electrically connecting the facer sheet material of each cover board of the array of cover boards to the facer sheet of each other of the cover boards of the array of cover boards.

7. The method according to claim 1 wherein an electrical connector is applied over the facer sheet material of at least one of the cover boards of the array of cover boards to electrically connect the cover board of the array of cover boards to at least one other of the cover boards of the array of cover boards.

* * * * *